United States Patent [19]

Levinson

[11] Patent Number: 4,880,951
[45] Date of Patent: Nov. 14, 1989

[54] FOOD PREPARATION KIT FOR USE IN COOKING FOOD IN MICROWAVE OVEN OR IN THERMAL OVEN

[75] Inventor: Melvin L. Levinson, Colonia, N.J.

[73] Assignee: General Housewares Corporation, Stamford, Conn.

[21] Appl. No.: 201,606

[22] Filed: Jun. 3, 1988

[51] Int. Cl.⁴ ............................................. H05B 9/06
[52] U.S. Cl. ..................... 219/10.55 E; 219/10.55 F; 99/DIG. 14; 426/243; 220/94 A; 220/408; 220/409
[58] Field of Search ................ 219/10.55 E, 10.55 F; 99/451, DIG. 14; 426/241, 242, 243; 220/94 A, 408, 409, 410; 428/450, 35

[56] References Cited

U.S. PATENT DOCUMENTS

| | | | |
|---|---|---|---|
| 3,155,267 | 11/1964 | Swett | 220/408 |
| 3,965,323 | 6/1976 | Forker, Jr. et al. | 219/10.55 E |
| 3,983,275 | 9/1976 | Winter et al. | 428/35 |
| 3,985,990 | 10/1976 | Levinson | 219/10.55 E |
| 4,106,486 | 8/1978 | Lee | 126/369 |
| 4,235,348 | 11/1980 | Watson | 220/90.4 |
| 4,250,215 | 2/1981 | Mayer | 428/35 |
| 4,271,344 | 6/1981 | Horiuchi et al. | 219/10.55 E |
| 4,299,160 | 11/1981 | Wokeck | 99/323.5 |
| 4,306,133 | 12/1981 | Levinson | 219/10.55 E |
| 4,477,705 | 10/1984 | Danley et al. | 219/10.55 E |
| 4,478,349 | 10/1984 | Haverland, Jr. et al. | 220/410 |
| 4,495,392 | 1/1985 | Derby | 219/10.55 E |
| 4,542,268 | 9/1985 | Jarvis et al. | 219/10.55 B |
| 4,542,271 | 9/1985 | Tanonis et al. | 219/10.55 E |
| 4,558,198 | 12/1985 | Levendusky et al. | 219/10.55 E |
| 4,663,506 | 5/1987 | Bowen et al. | 219/10.55 E |

Primary Examiner—A. D. Pellinen
Assistant Examiner—David Osborn
Attorney, Agent, or Firm—Harry B. Keck

[57] ABSTRACT

A cooking kit which is useful in cooking food in a microwave oven chamber and also can be employed in thermal ovens and on a cooking range. The kit includes an imperforate outer metal pot, a perforated inner metal pot which nests in the outer metal pot. The perforated bottom surface of the inner metal pot is spaced apart from the bottom surface of the outer metal pot to provide a metal shielded drainage collection chamber between the two pots. A microwave transmissive cover fits on the nested metal pots and forms a cooking chamber which includes at least the perforated inner metal pot. The outer metal pot is preferably coated with porcelain enamel which functions as a thermal and electrical insulator.

35 Claims, 3 Drawing Sheets

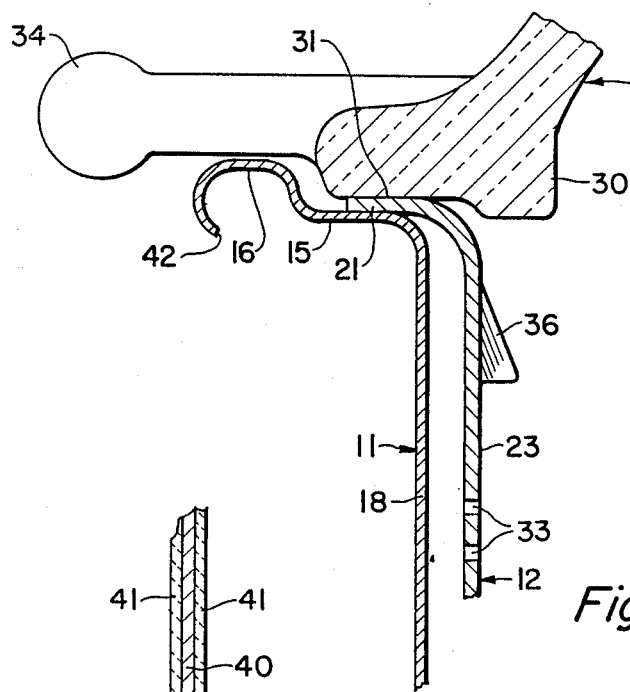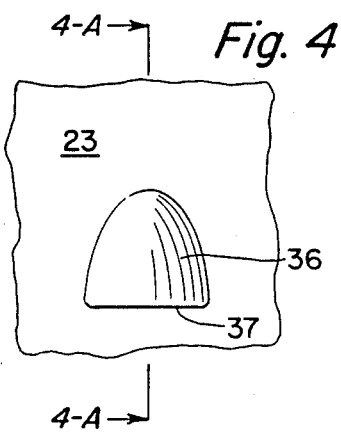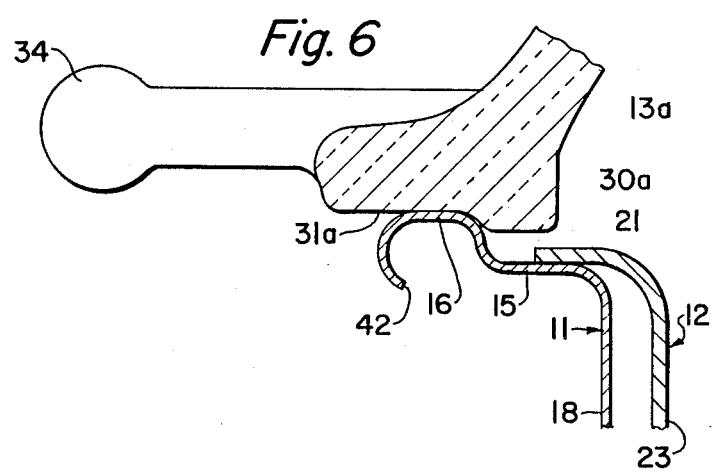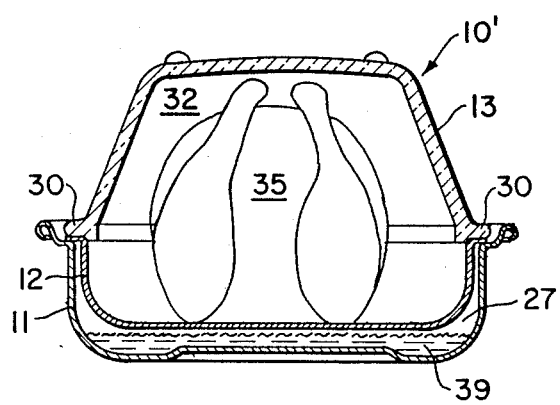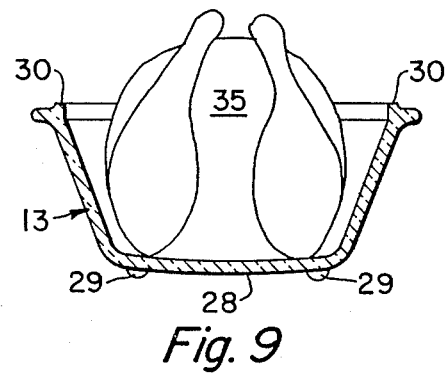

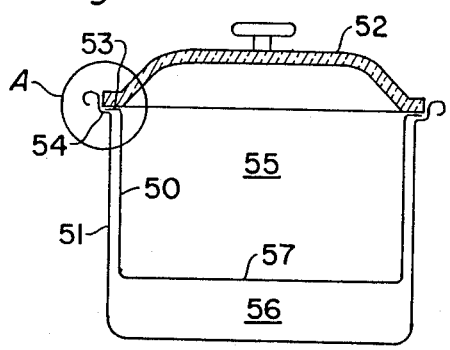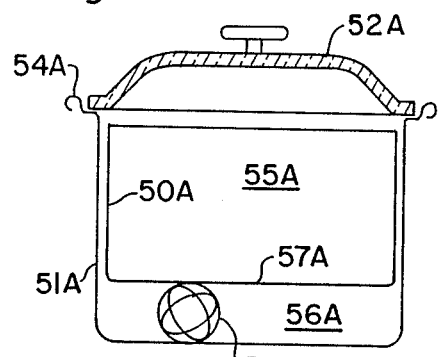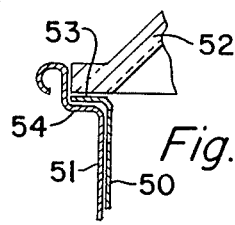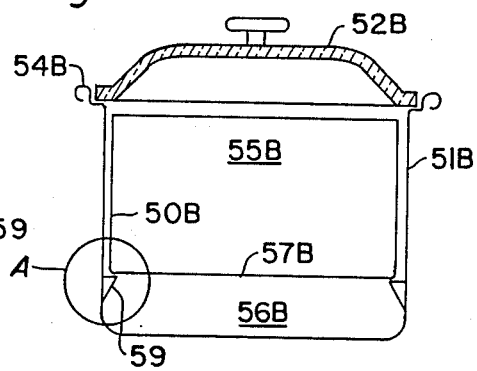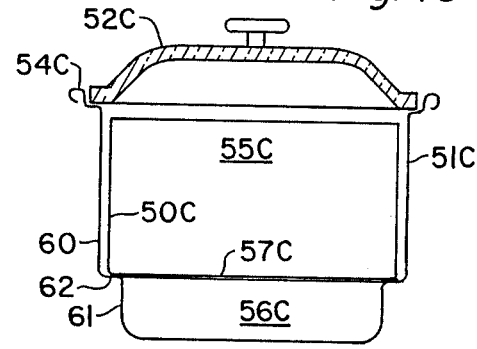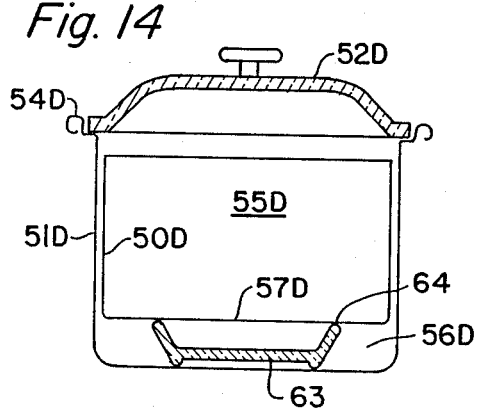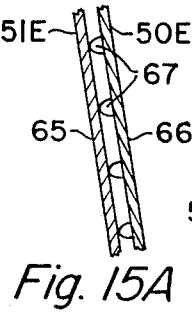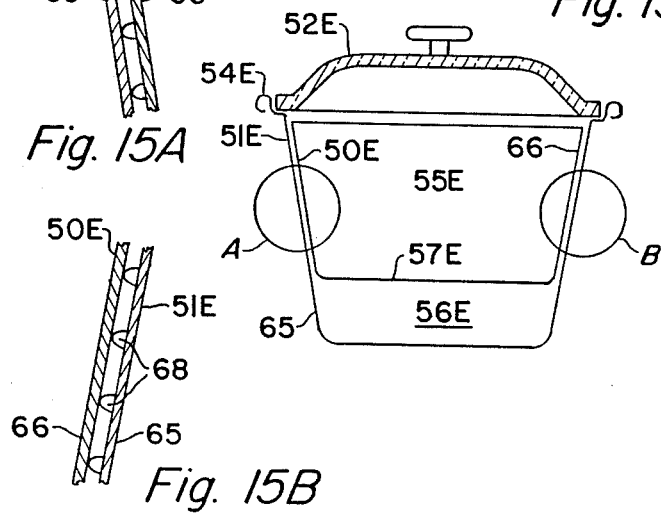

FOOD PREPARATION KIT FOR USE IN COOKING FOOD IN MICROWAVE OVEN OR IN THERMAL OVEN

BACKGROUND OF THE INVENTION

1. Field of the Invention

The present invention relates to a multi-component kit for cooking food in a microwave oven or in a thermal oven.

2. Description of the Prior Art

The rapid acceptance of microwave ovens for cooking and heating food has created a market for food preparation utensils which are uniquely useful in microwave ovens. The characteristics and limitations of microwave oven heating are well known. The disadvantages of cooking food with microwaves are set forth in MICROWAVE COOKING HANDBOOK, published by the International Microwave Power Institute, 1987, as:

1. Large quantities of food are slower cooking;
2. Crusts do not crisp;
3. Baked goods and small portions of meat do not brown;
4. No cooking designations now exist among various brands;
5. Cooking is often uneven due to the composition of foods.

The international Microwave Power Institute, ibid, lists advantages of microwave cooking as:

1. Small to medium portions of food are faster to heat or cook; a hot meal can be produced in minutes even straight from the freezer;
2. Electricity is more efficiently used; therefore, the microwave (oven) is often less expensive to use;
3. Generally less moisture evaporates from food;
4. A greater variety of cooking utensils can be used;
5. Cooking is safer than ordinary ovens;
6. There are no hot surfaces either inside or outside the oven:
7. Microwave ovens are among the safest appliances in the home;
8. Oven cavity walls remain cool, allowing easier removal of spills and spatters;
9. Vitamins and minerals are better retained in some foods, especially those needing less liquid than is required in conventional cooking;
10. The microwave is flexible and mobile; it can be moved from room-to-room and needs no special installation.

U.S. Pat. No. 3,985,990 discloses a microwave oven baking utensil which contains the following elements:

1. an outer imperforate metal container;
2. an inner metal container fitted within the outer container and having a perforated base;
3. a microwave-permeable lid or cover;
4. an electrically-insulating, heat-insulating container for the outer imperforate metal container.

The device of U.S. Pat. No. 3,985,990 provides a shielded chamber between the two metal containers which is surrounded by metal and thus is shielded from exposure to microwave energy. Drippings from food which is placed on the inner container will pass through the perforated base of the inner metal container into the shielded chamber for collection without significant further heating. Microwave energy penetrates the microwave-permeable lid or cover to heat the food and to drive off liquids and vapors from the food. The vapors are condensed on the inner walls of the cover and the inner container. The liquids and condensed vapors flow through the perforated base of the inner container into the shielded chamber.

The present invention comprises an improvement over the heating utensil which is described in the 3,985,990 patent.

STATEMENT OF THE PRESENT INVENTION

According to a preferred embodiment of the present invention a three element heating utensil combination includes:

1. an imperforate outer metal pot having an outwardly extending flange on its upper rim;
2. an inner metal pot having perforations in its bottom wall and optionally in its side walls, and having an outwardly extending flange on its upper rim which rests upon the flange extending from the upper rim of the outer metal pot;
3. a microwave-transmissive cover (preferably glass, ceramic, glass-ceramic or high temperature resistant plastic) which has an outer rim resting upon the upper rim flange of the inner metal pot or upon the upper rim flange of the outer metal pot, or upon both flanges.

The side walls of the inner metal pot are spaced apart from the side walls of the outer metal pot to facilitate insertion and removal of the inner metal pot. The inner metal pot has perforations over its base surface and, optionally, over its side wall surface of sufficient size to permit flow of liquids and gases between the inner metal pot and the outer metal pot. The space between the inner metal pot and the outer metal pot comprises a shielded space which is substantially entirely surrounded by metal and thus is insulated from penetration by microwave energy. The perforations of the inner metal pot are of suitable size to preclude or to minimize penetration of microwave energy into the shielded space. The outer metal pot preferably has a coating of porcelain enamel over its entire surface. The porcelain enamel coating functions as an electrical and thermal insulation coating. The inner metal pot also may be coated with porcelain enamel over one or both of its surfaces (inner and outer). In an alternative embodiment, the outer metal pot has the described porcelain enamel coating and the inner metal pot is bare metal, e.g., aluminum alloy. The cover preferably has handle means to facilitate its manipulation. The cover preferably is formed at least, in part, from substantially transparent heat-resistant glass to permit visual inspection of the contents of the pots. The cover also may be made of heat-resistant plastic or glass-ceramic or other microwave-transmissive materials.

The cover member, preferably dome-shaped, combines with the inner metal pot to define a substantially vapor-tight chamber for confining vaporized liquids and for delivering condensed vaporized liquids to the microwave shielded space.

In one embodiment, the overall shape of the cooking kit is generally rectangular having a short dimension of 6 to 12 inches and a long dimension of 8 to 18 inches. The height of the inner metal pot from base to rim preferably is 1.5 to 10 inches. The cover member, preferably dome-shaped, has a height from 2 to 6 inches and preferably weighs from 1.5 to 3.0 pounds. By providing a nearly flat central region for the cover, the cover member may, if inverted, function as a serving dish for cooked foods after the cooking has been completed. For this purpose, appropriate pedestals, in the form of glass or plastic or ceramic buttons, may be provided in the convex outer surface of the cover member.

THERMAL OVEN OR RANGE USE

The cooking kit of this invention has alternative uses in thermal cooking. The outer metal pot alone can be heated on a kitchen range to function as a soup kettle, sterilizing kettle, canning kettle, et cetera with or without the cover member. The combination of the outer metal pot, the inner metal pot and the cover member can be employed as a food steamer or bottle sterilizer by placing the assembled combination in an oven or on a heat source such as a kitchen range. A supply of water is provided in the shielded space between the two metal pots. The outer metal pot is heated by thermal convection, causing the water to vaporize and pass upwardly through the perforations of the inner metal pot into the cooking chamber where any food or other contents within the inner metal pot will be steam heated.

The cooking kit, with or without the cover member, can be employed as a roasting pan by placing food to be roasted (e.g., beef roast, poultry, fish, et cetera) in the inner metal pot and placing the combined inner metal pot and outer metal pot in a thermal oven the conductive, convective or radiant heating.

Having defined the preferred embodiment, several alternative embodiments will also be described which employ alternative means for supporting an inner metal pot . . . other than a support from the upper rim of the outer metal pot. These alternatives include:

1. an imperforate outer metal pot with an upper rim flange;
2. an inner metal pot having perforations in its bottom wall and optionally in its side walls and adapted to fit within the imperforate outer metal pot;
3. a microwave-transmissive cover which has an outer rim resting upon the upper rim flange of the outer metal pot.

The outer metal pot preferably has a coating of porcelain enamel over its entire surface which functions as an electrical and thermal insulation coating.

The additional alternative embodiments do not depend upon flange-to-flange support means for the inner metal pot, but instead depend upon support means for positioning the base of the inner metal pot above the base of the outer metal pot, whereby a microwave shielded chamber is maintained. In one embodiment, one or more spaced elements may be disposed beneath the base surface of the inner metal pot to rest upon the base surface of the outer metal pot and thus provide a spacing between the two base surfaces to define the shielded space. In another embodiment, the outer metal pot may be provided with several (preferably at least three) indent buttons to support the outer rim of the base of the inner metal pot. In a further embodiment, the outer metal pot may have a reduced diameter base region and a perimeter shoulder between the base region and the upper region. The inner metal pot rests upon the shoulder to maintain the required shielded space. In a further embodiment, a container such as a bowl (metal, glass, ceramic) may be provided to rest in the bottom of the outer metal pot with an upper rim to serve as a support for the base surface of the inner metal pot. In this embodiment, the perforation pattern on the base surface of the inner metal pot may coincide with the interior locus of the bowl so that the collected juices are selectively retained principally in the bowl member for subsequent processing. A further embodiment provides a slight taper to the side walls of the outer metal pot and a corresponding taper to the side walls of the inner metal pot. One of the other or both of the metal pots may be equipped with embossments (inwardly from the side walls of the outer metal pot; outwardly from the side walls of the inner metal pot) to maintain a small space between the two pots. The tapered side walls are designed to maintain the base of the inner metal pot above the base of the outer pot whereby the shielded space is maintained. All of these alternative embodiments provide the common features of combining (a) a cooking chamber with (b) a microwave shielded chamber in a microwave cooking kit which can function alternatively as a cooking utensil in a thermal oven.

The benefits and advantages of the present invention and its embodiments will become apparent by reference to the following detailed description and the accompanying drawings.

DESCRIPTION OF THE DRAWINGS

FIG. 4 is a fragmentary perspective illustration of an embossed cusp in the inner metal pot for handle engagement, attachment, or manual engagement.

FIG. 4-A is a fragmentary cross-section view taken along the line 4-A—4-A of FIG. 4 showing the side wall and one embossed cusp.

FIG. 5 is an enlarged corner detail showing a preferred embodiment of the perimeter conjunction of the cover rim, the inner metal pot rim and the outer metal pot rim.

FIG. 6 is a sketch similar to FIG. 5 showing an alternative embodiment of the perimeter conjunction of the cover rim, the outer metal pot rim and the inner metal pot rim.

FIG. 7 is a fragmentary cross-section view of a section of the outer metal pot.

FIG. 8 is a schematic cross-section illustration of the assembled kit including a chicken in the inner metal pot.

FIG. 9 is a schematic cross-section illustration of a chicken in the cover member in a rim-up position.

FIGS. 10 through 15 inclusive are cross-sectional illustrations of alternative embodiments of the present cooking kit.

FIG. 10A is an enlarged sectional view of the structure within the circle A of Fig. 10.

FIG. 12A is an enlarged sectional view of the structure within the circle A of FIG. 12.

FIGS. 15A and 15B are enlarged sectional views of the structure shown in circles A and B respectively of FIG. 15.

DESCRIPTION OF THE PREFERRED EMBODIMENTS

Figure 1:
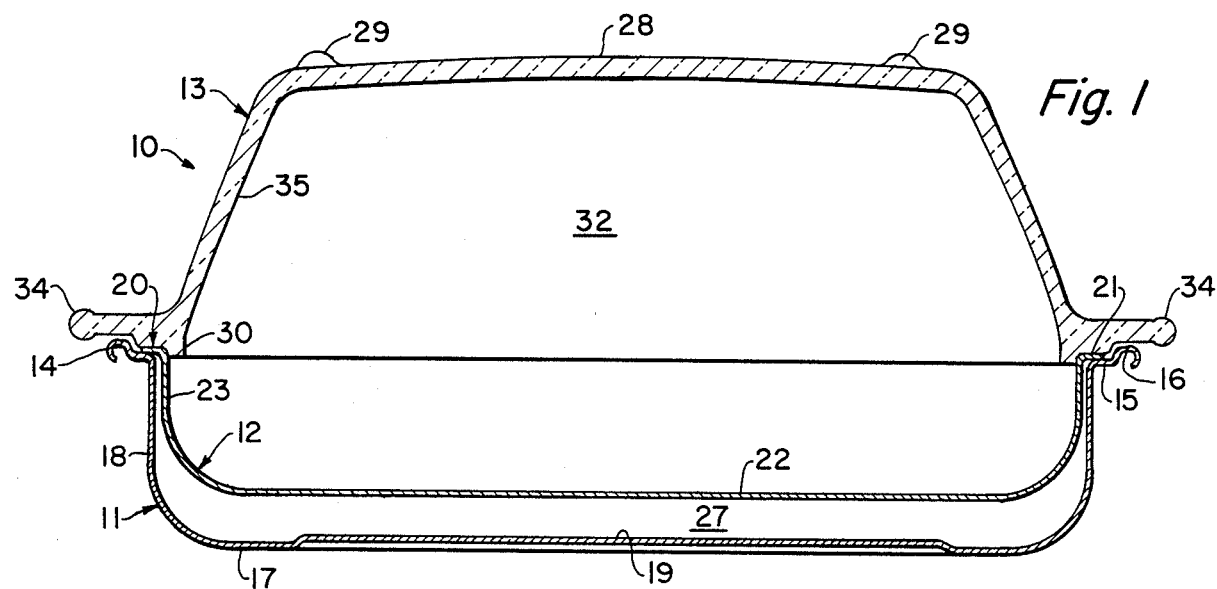
FIG. 1 is a sectional view of the cooking kit showing the inner metal pot, the outer metal pot and the ceramic or glass or heat-resistant plastic cover member in assembled relation.

The present cooking kit 10 includes three elements: an outer metal pot 11, an inner metal pot 12 and a microwave-transmissive (glass or ceramic) cover member 13. The outer metal pot 11 and the inner metal pot 12 are manufactured from metal or other microwave reflective material. They may be stainless steel, aluminum, aluminum-clad steel, copper; copper-clad steel; castiron; carbon-steel. The outer metal pot has a porcelain enamel or other ceramic coating over a suitable metal base.

The outer metal pot 11 has an upper rim 14 including a first outwardly extending shoulder 15, a terminal bead 16. The outer metal pot 11 has a base 17, upstanding side walls 18 and, in a preferred embodiment, has a raised platform 19 in its base 17. The shoulder 15 is generally parallel to the base 17.

The outer metal pot preferably is fabricated from porcelain enamel coated steel as illustrated in the schematic cross-section view in FIG. 7. A metal core 40, normally carbon steel, is coated on both surfaces with a porcelain enamel adherent coating 41. The porcelain enamel coating provides a tough, easy to clean, glassy surface for the outer metal pot. The porcelain enamel coating 41 also functions as an electrical and thermal insulator for the metal core 40, whereby the outer metal pot 11 is insulated from the walls or shelves of a microwave oven chamber and also is insulated from the inner metal pot 12. Nevertheless the porcelain enamel coated outer metal pot may be used alternatively as a soup kettle, a sterilizing kettle, a canning kettle, et cetera, with or without the cover member 13 on a kitchen thermal range (e.g., gas, electric or induction range) and may be used in a thermal oven chamber as a roasting pan if it is desired to prepare foods in a thermal oven chamber. In these alternative applications, the outer metal pot may be exposed to elevated temperatures which are successfully withstood by the porcelain enamel coated steel.

The use of porcelain enamel coated cooking ware is also desirable when cooking acidic foods because the inert glassy character of the porcelain enamel coating resists undesirable chemical interaction between the food and the container.

The inner metal pot 12 is a food-supporting pot having an upper rim 20 with an outwardly extending pot-rim flange 21 which is adapted to rest upon the shoulder 15 of the outer metal pot 11. The inner metal pot 12 has substantially flat base 22 and substantially vertical side walls 23 which are spaced apart from the vertical side walls 18 of the outer metal pot. The base 22 has a number of perforations 24 which are large enough to permit the flow of liquids and gases in either direction and small enough to preclude or substantially minimize the passage of microwave energy. Openings of 1/16 to 3/8 inch are suitable. A typical perforation pattern is illustrated in FIG. 3.

Figure 2:
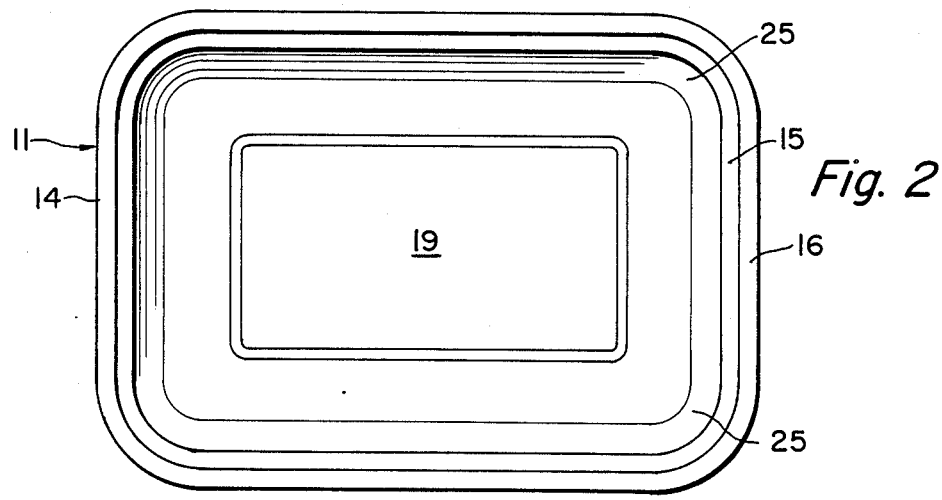
FIG. 2 is a plan view of the outer metal pot.
Figure 3:
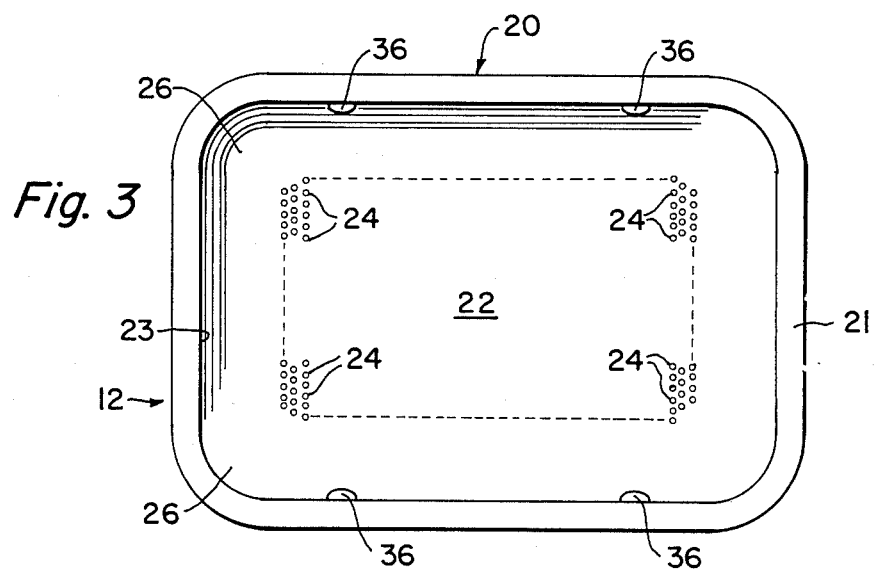
FIG. 3 is a plan view of the inner metal pot.

It will be observed from FIGS. 2 and 3 that the plan view of the outer and inner metal pots 11, 12 respectively is generally rectangular. The corners 25 (FIG. 2), 26 (FIG. 3) are rounded with relatively large arcs to preclude metal concentrations which would occur in small radius corner. Sharp or small radius corners of metal have been reported to be deleterious in microwave oven cookware. Relatively wider arcs moreover facilitate cleaning and maintenance of the metal pots 11, 12.

In the preferred rectangular embodiment, the outer metal pot 11 has a length of 8 to 18 inches and a width of 6 to 12 inches to permit convenient use in standard domestic microwave ovens. Larger or smaller dimensions may be desirable for commercial or specialized cooking applications. The height of the inner metal pot 12 is preferably from 1½ to 10 inches. The outer metal pot 11 preferably is 0.5–2.0 inches deeper than the inner metal pot 12.

A specific embodiment employs an outer metal pot having dimensions of 9 inches wide by 12 inches long by 2.5 inches high; the inner metal pot is 11¼ inches long by 8¼ inches wide by 1¾ inches high; a heat-resistant glass cover has a rim 11 inches long, 7¼ inches wide and a height of 3½ inches; 459 perforations in the inner metal pot are 0.156 inch diameter each in 24 rows.

In order to facilitate lifting the inner metal pot 12 from the outer metal pot 11, a handle means may be provided. One suitable means, shown in FIG. 4 and FIG. 4-A is an embossed cusp 36 providing a shoulder surface 37 to receive any appropriate handle device (not shown). Multiple embossed cusps 36 preferably are provided in the side walls 23 of the inner metal pot 12 as shown in FIGS 3 and 5. The cusps may be used to facilitate manual lifting of the inner metal pot.

While the generally rectangular shape has been illustrated as a preferred embodiment, it should be understood that the plan view can be oval, circular, rounded, square or other suitable geometrical pattern.

Between the inner metal pot 12 and the outer metal pot 11 there is a shielded space 27 in which liquids can be collected and retained without further exposure to microwave energy.

A cover member 13 is fabricated from microwave transmissive material such as heat resistant glass or glass-ceramic or heat-resistant plastic material. The cover member 13 is preferably dome-shaped and has a central region 28 which is flat or slightly dished, with several (preferably 3) pedestals 29 which are formed from the heat resistant glass or glass-ceramic or heat-resistant plastic material. The function of the pedestals 29 is to permit the cover member 13 to be employed as a container or bowl by inverting the cover member 13 and allowing it to rest on the pedestals 29.

The cover member 13 has a rim 30 which generally coincides with the rims 14, 20 of the outer metal pot 11 and inner metal pot 12 respectively. A flared skirt 35 extends from the upper surface 28 to the rim 30. In a preferred embodiment illustrated in FIG. 5, the cover rim 30 has a shoulder 31 which rests upon the outward flange 21 of the inner metal pot 12. In an alternative embodiment illustrated in FIG. 6, the cover rim 30a has an outer shoulder 31a resting upon the lip 16 of the outer metal pot 11. Either of the embodiments of FIG. 5 or FIG. 6 will present (refer to FIG. 1) an enclosed chamber 32 which is defined by the cover member 13 and the upper rim 20 of the inner metal pot 12 or the upper rim 14 of the outer metal pot 11 or both. The chamber 32 is confines vapors whereby any vapors generated within the chamber 32 will condense on the inner walls of the cover member 13 or the inner surface of the inner metal pot 12. Vapors and condensed liquids will pass through the perforations 24 in the base 22 into the shielded space 27 where, deprived of exposure to microwave energy, the vapors will cool and condense and the liquids will remain relatively cool throughout the cooking process. It may be desirable to provide perforations 33 (FIG. 5) in the side wall 23 of the inner metal pot 12.

While the cover member 13 has been illustrated as formed entirely of heat resistant glass, it is possible that the cover member 13 can be formed of other microwave transmissive materials. A preferred alternative material is glass-ceramic which is microwave transmissive and also heat resistant. The cover 13 may be formed in part from metals which are microwave reflective so long as a substantial window of microwave transmissive material is included in the cover member. The use of transparent heat resistant glass is preferred because it permits the visual inspection of the contents of cooking kit and is equally useful in a high temperature thermal oven or kitchen range environment.

The cover member 13 is equipped with handle 34 which are preferably diagonally opposed to each other. The handle members 34 may be cast from the same material which forms the cover member 13, i.e., heat resistant glass or glass-ceramic or heat-resistant plastic material. Alternatively the handle members 34 may be fastened to the cover member 13. The cover member 13 has a flared depending skirt between the central region 28 and the rim 30. Preferably the cover member has a weight of about 1.5 to 3.0 pounds to provide a superatmospheric steam pressure within the cooking chamber 32.

It will be observed from FIGS. 5 and 6 that the terminal bead 16 of the outer metal pot 11 is rounded so that the edge 42 of the bead 16 is disposed in a re-entrant position facing the shoulder 15. The re-entrant edge 42 is particularly useful when the outer metal pot 11 is coated with a porcelain enamel coating. Porcelain enamel coatings tend to spall near free edges and expose the bare metal beneath the spalls. The tendency to spall is greatly diminished by the re-entrant edge position. Moreover any resulting exposed metal resulting from spalls on the edge 42 will not become a focus for objectionable sparking when exposed to microwave energy because of their protected re-entrant location beneath the terminal bead 16.

COOKING METHOD

The present microwave oven cooking kit optimally is employed in a microwave oven to roast meats such as beef, lamb, pork, poultry, fish and seafood. Consider a roasting chicken as representative and as illustrated in FIG. 8. A raw, cleaned chicken 35 is placed in the inner metal pot 12 which is nested in the outer metal pot 11. The cover member 13 is applied and the assembled kit 10' containing the chicken 35 is placed in a microwave oven (not shown). Microwaves penetrate the transmissive cover 13 and raise the temperature of the chicken 35. As the temperature rises, juices (water, fats, oils and other drippings) pass from the chicken 35 through the perforations 24 (not seen in FIG. 8) of the base 22 of the inner metal pot 12 and are collected as a pool 39 in the shielded space 27 between the two metal pots 11, 12. As the roasting process continues, the temperature of the chicken 35 increases and some of the juices tend to volatilize and thereafter to condense on the inner surface of the cover 13 or the inner surface of the inner metal pot 12 and flow into the shielded space 27. The temperature of the inner metal pot 12 will, by thermal conduction, approach the temperature of the chicken 35. The inner metal pot 12 and the chicken 35 are in contact. The inner metal pot 12 does not become significantly hotter or colder than the chicken 35. Conversely, the chicken 35 does not become significantly hotter or colder than the inner metal pot 12. The inner metal pot 12 and a major portion of the chicken 35 will not rise in temperature above the boiling temperature of water so long as the chicken retains any significant moisture. The outer metal pot 11, meanwhile, is in contact with the condensed liquids in the pool 39. Thus the outer metal pot 11 and the liquids in the pool 39 have a common temperature which is relatively low, e.g., below the boiling temperature of water. The hotter inner metal pot 12 does not readily conduct its heat through the cover 13 (a non-conductor) nor through the outer metal pot 11 (coated with a thermal insulating porcelain enamel coating). The air space between the inner metal pot 12 and the outer metal pot 11 presents an additional thermal insulating barrier to heat transfer from the inner metal pot 12 to the outer metal pot 11. Microwave energy within the oven is reflected by both the inner metal pot 12 and the outer metal pot 11. Thus the only heat source within the microwave oven chamber is the microwave absorptive contents of the inner metal pot 12, namely, the chicken 35.

When the chicken 35 has been cooked to the desired degree of "doneness", its upper surface will exhibit darkening ("browning") as a result of direct absorption of microwave energy. Continued cooking will increase the surface browning.

Throughout the cooking process, the drippings from the chicken 35 have been collected in the relatively cool, shielded space 27 between the metal pots 11, 12. The drippings are light in color and generally clear because there has been no significant thermal deterioration of the juices. The drippings can be poured from the outer metal pot 11 into a suitable collector, e.g., a jar or bowl or pan. The juices may be deposited in a refrigerator for cooling. The cooled fats and greases will congeal and solidify on the surface of a container for easy removal. The remaining juices can be used in further cooking to prepare consomme, soups, sauces, gravies and other food products.

Vegetables may be introduced into the inner metal pot 12 while the chicken 35 is cooking in the microwave oven. Onions, celery, carrots, potatoes and the like may be cooked along with the chicken 35. The vegetable juices similarly will pass into the shielded space 27 and blend with the drippings from the chicken 35 in the pool 39.

The cover member 13 may be removed in the final cooking (browning) of the food. The cover 13 may be used as a serving bowl. As shown in FIG. 9, the cover 13 in its rim-up position is a bowl which can contain the chicken 35 for final cooking (browning) or for serving or both.

ALTERNATIVE CONSTRUCTION

The preferred embodiment of the present invention, illustrated in FIG. 10, employs an inner metal pot 50, an imperforate outer metal pot 51 and a microwave transmissive cover 52 wherein the inner metal pot 50 is supported by means of an upper flange 53 which rests upon the upper flange 54 of the outer metal pot 51 as more clearly illustrated in FIG. 10A. The resulting construction includes a cooking chamber 55 and a microwave shielded liquid collection chamber 56. The base 57 of the inner metal pot 50 is provided with perforations as described.

In FIG. 11, the inner metal pot 50A is not suspended from the upper rim 54 of the imperforate outer metal pot 51, but instead rests upon a spacer member 58 which is illustrated in FIG. 11 as a spherical ball formed from two or more connected circular rings. The spacer member 58 functions to support the inner metal pot above the bottom of the imperforate outer metal pot 51A and thus to maintain the shielded space 56A. The spacer member 58 alternatively could be leg members (not shown) depending from the base 57A of the inner metal pot 50A or any other device interposed between the base 57A above the bottom of the outer metal pot 51A to support the base 57A. In FIG. 14 infra a bowl 63 is illustrated as a spacer member.

In FIG. 12, the imperforate outer metal pot 51B is provided with at least one inward detent 59 (see FIG. 12A) upon which the inner metal pot 50B can rest and be supported above the bottom of the imperforate outer metal pot 51B to maintain the shielded space 56B.

In FIG. 13, the imperforate outer metal pot 51C has a wide diameter upper region 60 and a narrow lower region 61. A shoulder 62 joins the upper region 60 and the lower region 61 and provides a perimeter resting surface for the inner metal pot 50C.

In FIG. 14, a bowl 63 having an upper rim 64 is placed in the bottom of the imperforate outer metal pot 51D. The inner metal pot 50D rests upon the upper rim 64 of the bowl 63 and thereby the base 57D is supported above the bottom of the imperforate outer metal pot 51D. In this embodiment, the perforation pattern on the base 57D may be adapted to conform with the configuration of the bowl 63. In the embodiment of FIG. 14, juices drained from the cooking chamber 55D can be collected selectively within the bowl 63 for further processing. The bowl 63 may be made of heat-resistant glass, glass-ceramic, metal, high temperature-resistant plastic, pottery.

In FIG. 15, the imperforate outer metal pot 51E has tapered side walls 65 and the inner metal pot 50E has correspondingly tapered side walls 66. The inner metal pot 50E may be provided with outwardly embossed buttons or strips or other surfaces 67 (see FIG. 15A) to provide a small spacing between the inner metal pot 50E and the imperforate outer metal pot 51E. Alternatively, inwardly pressed buttons, strips or other shapes 68 may be provided in the side wall 65 of the imperforate outer metal pot 51E (see FIG. 15B) for the same purpose.

It will be observed in all of the alternative constructions in FIGS. 11, 12, 13, 14, 15 that the cooking kit contains a cooking chamber 55A, 55B, 55C, 55D, 55E and a microwave shielded chamber 56A, 56B, 56C, 56D, 56E; that the side walls of the inner metal pot 50A, 50B, 50C, 50D, 50E are slightly spaced from the side walls of the imperforate outer metal pot 51A, 51B, 51C, 51D, 51E. The base 57A, 57B, 57C, 57D, 57E of the inner metal pot is spaced above the bottom of the imperforate outer metal pot 51A, 51B, 51C, 51D, 51E in all of these alternative constructions. The microwave transparent cover 52A, 52B, 52C, 52D, 52E has its rim engaged with the upper rim 54A, 54B, 54C, 54D, 54E of the imperforate outer metal pot 51A, 51B, 51C, 51D, 51E to provide a steam confining construction for cooking chamber 55A, 55B, 55C, 55D, 55E. It should be observed that the upper rims 54A, 54B, 54C, 54D, 54E are provided with re-entrant curled edges to minimize spalling of the porcelain enamel coatings. By maintaining the space between the side walls of the inner metal pot 50A, 50B, 50C, 50D, 50E and the imperforate outer metal pot 51A, 51B, 51C, 51D, 51E fairly small, the amount of microwave penetration into the shielded chamber 56A, 56B, 56C, 56D, 56E can be substantially eliminated. The preferred spacing between the side walls of the inner metal pot 50A, 50B, 50C, 50D, 50E and the imperforate outer metal pot 51A, 51B, 51C, 51D, 51E in the embodiments shown in FIGS. 11, 12, 13, 14, 15 is preferably about 0.5-3.0 millimeters. All of the embodiments in FIGS. 10, 11, 12, 13, 14, 15 include a means for maintaining the base 57 (57A, 57B, 57C, 57D, 57E) of the inner metal pot 50 (50A, 50B, 50C, 50D, 50E) above the base of the imperforate outer metal pot 51 (51A, 51B, 51C, 51D, 51E).

Appropriate handle means or handle engaging means (such as openings in the side walls or inward deformations of the side walls of the inner metal pot 50 (50A, 50B, 50C, 50D, 50E) may be provided to facilitate insertion of and removal of the inner metal pots from the outer metal pots.

Each of the alternative constructions in FIGS. 10, 11, 12 13, 14, 15 may also be employed for cooking in a thermal oven or on a thermal range if desired.

I claim:

1. A cooking kit for use in a microwave oven and for use in a thermal oven and on a thermal range, comprising:

(a) an imperforate metal pot having a first base surface, upwardly extending first side walls and a rim at the top of said first side walls including an outwardly extending shoulder generally parallel to the plane of the said first base surface; a ceramic coating covering the inner surface and the outer surface of said imperforate metal pot;

(b) a food supporting metal pot having a second base surface, upwardly extending second side walls and a second rim at the top of said second side walls including an outwardly extending pot-rim flange; a plurality of perforations in the said second base surface, said perforations being of such size as to permit the flow of gas and liquids through the perforations but to preclude or substantially minimize passage of microwaves through the perforations;

(c) a cover having a depending skirt and a cover rim at the bottom of said skirt, said cover having a microwave-transmissive region, the said cover rim being engageable with at least one of the said rim of said imperforate metal pot or the said outwardly extending pot-rim flange;

said food-supporting metal pot being of such size to fit within said imperforate metal pot with the said outwardly extending pot-rim flange resting upon said shoulder, said second side walls being inwardly spaced from first said walls and said second base surface being spaced apart from said first base surface, to define a shielded space surrounded by metal and perforated metal from which microwave energy is substantially excluded.

2. A cooking kit of Claim 1 wherein: wherein said cover rim rests upon said outwardly extending potrim flange whereby (a) a substantially vapor-confining cooking chamber is established, which is defined by said cover and said food supporting metal pot: and (b) a drainage collection and steam condensation chamber is established, which is defined by said food supporting metal pot and said imperforate metal pot, substantially entirely shielded from microwave penetration.

3. A cooking kit of claim 1 including handle means for lifting said food supporting metal pot independently of said imperforate metal pot.

4. A cooking kit of claim 1 wherein said ceramic coating is porcelain enamel on metal.

5. A cooking kit of claim 1 wherein said food supporting metal pot is fabricated from steel and is at least in part coated with porcelain enamel.

6. A cooking kit of claim 1 wherein said imperforate metal pot has an outer lip extending outwardly from said shoulder.

7. A cooking kit of claim 6 wherein the edge of said outer lip is curled beneath the outer lip and is re-entrant toward the said outward shoulder.

8. A cooking kit of claim 1 wherein the said food supporting metal pot is formed from bare, uncoated metal.

9. A cooking kit of claim 8 wherein the said food supporting pot is fabricated from aluminum alloy.

10. A cooking kit of claim 8 wherein said food supporting pot is fabricated from steel which has an aluminum alloy cladding on both surfaces.

11. A cooking kit of claim 8 wherein said cover is formed, at least in part, from heat resistant glass.

12. A cooking kit of claim 8 wherein said cover is formed, at least in part, from glass-ceramic material.

13. A cooking kit of claim 1 wherein the said food supporting metal pot has a coating of high-temperature resistant plastic over at least a portion of its inner walls.

14. A cooking kit of claim 1 wherein said imperforate metal pot has at least one embossed area on the central portion of said first base surface.

15. A cooking kit for use in a microwave oven and for use in a thermal oven and on a thermal range, comprising:
  (a) an imperforate metal pot having a first base surface, upwardly extending first side walls and a rim at the top of said first side walls; a ceramic coating covering the inner surface and the outer surface of said imperforate metal pot;
  (b) a food supporting metal pot having a second base surface and upwardly extending second side walls; a plurality of perforations in the said second base surface, said perforations being of such size as to permit the flow of gas and liquids through the perforations but to preclude or substantially minimize passage of microwaves through the perforations;
  (c) a cover having a depending skirt and a cover rim at the bottom of said skirt, said cover having a microwave-transmissive region, the said cover rim being engageable with the said rim of said imperforate metal pot;
  said food-supporting metal pot being of such size to fit within said imperforate metal pot; means for supporting the said second base surface above the said first base surface; whereby the said second base surface, the said first base surface and a portion of the side walls of said imperforate metal pot define a shielded space substantially entirely surrounded by metal and perforated metal from which microwave energy is substantially excluded;
  a vapor-confining food cooking chamber below said cover and above the said second base surface.

16. A cooking kit according to claim 15 wherein said cover rim rests upon said rim of said imperforate metal pot to establish the said vapor-confining cooking chamber.

17. The cooking kit of claim 16 wherein the said cover weighs from 1.5 to 3.0 pounds to maintain a superatmospheric pressure in said cooking chamber.

18. A cooking kit of claim 15 including handle means for lifting said food supporting metal pot independently of said imperforate pot.

19. A cooking kit of claim 15 wherein said ceramic coating is porcelain enamel on metal.

20. A cooking kit of claim 15 wherein said food supporting metal pot is fabricated from steel and is at least in part coated with porcelain enamel.

21. A cooking kit of claim 15 wherein said imperforate metal pot has an outer lip extending outwardly from said rim and wherein the edge of said lip is curved beneath the said lip and is re-entrant toward the said side walls.

22. A cooking kit of claim 15 wherein the said food supporting metal pot is formed from bare, uncoated metal.

23. A cooking kit of claim 22 wherein the said food supporting pot is fabricated from aluminum alloy.

24. A cooking kit of claim 22 wherein said food supporting metal pot is fabricated from steel which has an aluminum alloy cladding on both surfaces.

25. A cooking kit of claim 22 wherein said cover is formed, at least in part, from heat resistant glass.

26. A cooking kit of claim 22 wherein said cover is formed, at least in part, from glass-ceramic material.

27. A cooking kit of claim 15 wherein said imperforate metal pot has at least one embossed area on the central portion of said first base surface.

28. A cooking kit for use in a microwave oven and for use in a thermal oven and on a thermal range, comprising:
  (a) an imperforate metal pot having a first base surface, upwardly extending first side walls and a rim at the top of said first side walls; a ceramic coating covering the inner surface and the outer surface of said imperforate metal pot;
  (b) a food supporting metal pot having a second base surface and upwardly extending second side walls; a plurality of perforations in the said second base surface, said perforations being of such size as to permit the flow of gas and liquids through the perforations but to preclude or substantially minimize passage of microwaves through the perforations;
  (c) a cover having a depending skirt and a cover rim at the bottom of said skirt, said cover having a microwave-transmissive region, the said cover rim being engageable with the said rim of said imperforate metal pot;
  said food-supporting metal pot being of such size to fit within said imperforate metal pot; spacer means within the said imperforate metal pot resting upon the said first base surface and supporting the said second base surface above the said first base surface; whereby the said second base surface, the said first base surface and a portion of the side walls of said imperforate metal pot define a shielded space substantially entirely surrounded by metal and perforated metal from which microwave energy is substantially excluded;
  a vapor-confining food cooking chamber below said cover and above the said second base surface.

29. A cooking kit for use in a microwave oven and for use in a thermal oven and on a thermal range, comprising:
  (a) an imperforate metal pot having a first base surface, upwardly extending first side walls and a rim at the top of said first side walls; a ceramic coating covering the inner surface and the outer surface of said imperforate metal pot;
  (b) a food supporting metal pot having a second base surface and upwardly extending second side walls; a plurality of perforations in the said second base surface, said perforations being of such size as to permit the flow of gas and liquids through the perforations but to preclude or substantially minimize passage of microwaves through the perforations;

(c) a cover having a depending skirt and a cover rim at the bottom of said skirt, said cover having a microwave-transmissive region, the said cover rim being engageable with the said rim of said imperforate metal pot;

said food-supporting metal pot being of such size to fit within said imperforate metal pot; at least one inward detent member in the side wall of the said imperforate metal pot for supporting the said second base surface above the said first base surface; whereby the said second base surface, the said first base surface and a portion of the side walls of said imperforate metal pot define a shielded space substantially entirely surrounded by metal and perforated metal from which microwave energy is substantially excluded;

a vapor-confining food cooking chamber below said cover and above the said second base surface.

30. A cooking kit for use in a microwave oven and for use in a thermal oven and on a thermal range, comprising:

(a) an imperforate metal pot having a first base surface, upwardly extending first side walls and a rim at the top of said first side walls; a ceramic coating covering the inner surface and the outer surface of said imperforate metal pot;

(b) a food supporting metal pot having a second base surface and upwardly extending second side walls; a plurality of perforations in the said second base surface, said perforations being of such size as to permit the flow of gas and liquids through the perforations but to preclude or substantially minimize passage of microwaves through the perforations;

(c) a cover having a depending skirt and a cover rim at the bottom of said skirt, said cover having a microwave-transmissive region, the said cover rim being engageable with the said rim of said imperforate metal pot;

said food-supporting metal pot being of such size to fit within said imperforate metal pot; the said side walls of said imperforate metal pot having a wide diameter upper region, a narrow diameter lower region and a perimeter shelf between the said upper region and said lower region; said shelf supporting the said food-supporting metal pot above the said first base surface; whereby the said second base surface, the said first base surface and a portion of the side walls of said imperforate metal pot define a shielded space substantially entirely surrounded by metal and perforated metal from which microwave energy is substantially excluded;

a vapor-confining food cooking chamber below said cover and above the said second base surface.

31. A cooking kit for use in a microwave oven and for use in a thermal oven and on a thermal range, comprising:

(a) an imperforate metal pot having a first base surface, upwardly extending first side walls and a rim at the top of said first side walls; a ceramic coating covering the inner surface and the outer surface of said imperforate metal pot;

(b) a food supporting metal pot having a second base surface and upwardly extending second side walls; a plurality of perforations in the said second base surface, said perforations being of such size as to permit the flow of gas and liquids through the perforations but to preclude or substantially minimize passage of microwaves through the perforations;

(c) a cover having a depending skirt and a cover rim at the bottom of said skirt, said cover having a microwave-transmissive region, the said cover rim being engageable with the said rim of said imperforate metal pot;

said food-supporting metal pot being of such size to fit within said imperforate metal pot; a bowl positioned in the said imperforate outer metal pot, said bowl having an upper rim which supports the said second base surface above the said first base surface; whereby the said second base surface, the said first base surface and a portion of the side walls of said imperforate metal pot define a shielded space substantially entirely surrounded by metal and perforated metal from which microwave energy is substantially excluded;

a vapor-confining food cooking chamber below said cover and above the said second base surface.

32. The cooking kit of claim 31 wherein the said perforations of the said second base surface are provided in a pattern which corresponds to the configuration of said bowl.

33. A cooking kit for use in a microwave oven and for use in a thermal oven and on a thermal range, comprising:

(a) an imperforate metal pot having a first base surface, tapered first side walls and a rim at the top of said first side walls; a ceramic coating covering the inner surface and the outer surface of said imperforate metal pot;

(b) a food supporting metal pot having a second base surface and tapered second side walls; a plurality of perforations in the said second base surface, said perforations being of such size as to permit the flow of gas and liquids through the perforations but to preclude or substantially minimize passage of microwaves through the perforations;

(c) a cover having a depending skirt and a cover rim at the bottom of said skirt; said cover having a microwave-transmissive region, the said cover rim being engageable with the said rim of said imperforate metal pot;

said food-supporting metal pot being of such size to fit within said imperforate metal pot; the side walls of the two said metal pots being tapered such that the said second base surface is supported by the tapered side walls above the said first base surface, whereby the said second base surface, the said first base surface and a portion of the side walls of said imperforate metal pot define a shielded space substantially entirely surrounded by metal and perforated metal from which microwave energy is substantially excluded;

a vapor-confining food cooking chamber below said cover and above the said second base surface.

34. The cooking kit of claim 33 wherein embossments are provided on at least one of the said tapered side walls to maintain a desired spacing between the two said metal pots.

35. A cooking kit for use in a microwave oven and for use in a thermal oven and on a thermal range, comprising:
 (a) an imperforate metal pot having a first base surface, upwardly extending first said walls and a rim at the top of said first side walls; a ceramic coating covering the inner surface of said imperforate metal pot;
 (b) a food supporting metal element having a second base surface; a plurality of perforations in the said second base surface, said perforations being of such size as to permit the flow of gas and liquids through the perforations but to preclude or substantially minimize passage of microwaves through the perforations;
 (c) a cover having a microwave-transmissive region and being engageable with the said rim of said imperforate metal pot;
 said food-supporting metal element being of such size to fit within said imperforate metal pot; support means for supporting the said second base surface above the said first base surface; whereby the second base surface and the said first base surface define a shielded space substantially entirely surrounded by metal and perforated metal from which microwave energy is substantially excluded;
 a vapor-confining food cooking chamber below said cover and above the said second base surface.

* * * * *